US009828053B2

(12) United States Patent
Taguchi et al.

(10) Patent No.: US 9,828,053 B2
(45) Date of Patent: Nov. 28, 2017

(54) VEHICLE ASSEMBLY LINE

(71) Applicant: MITSUBISHI JIDOSHA KOGYO KABUSHIKI KAISHA, Tokyo (JP)

(72) Inventors: Tohru Taguchi, Tokyo (JP); Mikio Nakamura, Tokyo (JP); Yoshihisa Yamaguchi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/911,076

(22) PCT Filed: Aug. 27, 2014

(86) PCT No.: PCT/JP2014/072447
§ 371 (c)(1),
(2) Date: Feb. 9, 2016

(87) PCT Pub. No.: WO2015/030058
PCT Pub. Date: Mar. 5, 2015

(65) Prior Publication Data
US 2016/0176461 A1    Jun. 23, 2016

(30) Foreign Application Priority Data

Aug. 28, 2013  (JP) .................................. 2013-176334

(51) Int. Cl.
*B65G 17/00* (2006.01)
*B62D 65/18* (2006.01)

(52) U.S. Cl.
CPC .................... *B62D 65/18* (2013.01)

(58) Field of Classification Search
CPC ..................................................... B62D 65/18
(Continued)

(56) References Cited

U.S. PATENT DOCUMENTS 7,350,613 B2 *  4/2008  Dehne ................... B62D 65/18
                                                 180/167
7,469,473 B2 * 12/2008  Savoy ................... B62D 65/02
                                                 269/297
(Continued)

FOREIGN PATENT DOCUMENTS

CN        101549718 A      10/2009
CN        201801291 U       4/2011
(Continued)

OTHER PUBLICATIONS

International Preliminary Report on Patentability (Chapter 1) issued Mar. 10, 2016 in corresponding PCT Application No. PCT/JP2014/072447 with an English Translation.

*Primary Examiner* — William R Harp
(74) *Attorney, Agent, or Firm* — Birch, Stewart, Kolasch & Birch, LLP (57) ABSTRACT

To improve working efficiency of mounting components in a lower part of a vehicle body, a vehicle assembly line includes a supporting unit to support a vehicle body in a position such that the front direction of the vehicle body is perpendicular to the conveying direction. The supporting unit includes an upstream supporting member and a downstream supporting member provided upstream and downstream of the platform along the conveying direction, respectively. The centers of the support columns fixed to a platform, of the upstream supporting member and the downstream supporting member, are located upstream and downstream, respectively, with respect to a center line CLb of the platform extending in a direction perpendicular to the conveying direction of the platform, and located apart from and opposite to each other across a center line CLa of the (Continued)

platform extending in the conveying direction, to provide a working space for mounting below the vehicle body supported by the carrier device.

9 Claims, 7 Drawing Sheets

(58) Field of Classification Search
USPC .................. 198/793, 465.1, 465.2, 465.3
See application file for complete search history.

(56) References Cited

U.S. PATENT DOCUMENTS

| | | | |
|---|---|---|---|
| 8,157,079 B2* | 4/2012 | Assmann | B62D 65/18 198/345.1 |
| 2005/0188892 A1* | 9/2005 | Ueno | B61B 13/127 104/168 |
| 2009/0250315 A1 | 10/2009 | Nakagawa et al. | |
| 2011/0308075 A1 | 12/2011 | Tohyama et al. | |

FOREIGN PATENT DOCUMENTS

| | | |
|---|---|---|
| CN | 102317142 A | 1/2012 |
| JP | 2009-001182 A | 1/2009 |
| JP | 2009-248657 A | 10/2009 |
| JP | 2010-188790 A | 9/2010 |
| JP | 4752929 B2 | 8/2011 |

* cited by examiner

VEHICLE ASSEMBLY LINE

TECHNICAL FIELD

The present disclosure relates to a vehicle assembly line, particularly to a vehicle assembly line for mounting a component in a lower part of the vehicle body.

BACKGROUND

Heretofore, there are various known techniques about vehicle assembly line for manufacturing vehicles including cars. For example, Patent Document 1 discloses such a technique.

Patent Document 1 discloses a vehicle assembly line having a plurality of carrier devices for supporting a vehicle body and moving on a floor with the vehicle body supported to carry the vehicle body along the assembly line.

The plurality of carrier devices includes a supporting unit for supporting the vehicle body in a position such that the front-back direction of the vehicle body is perpendicular to a conveying direction, and a platform for fixing the supporting unit thereon.

The supporting unit includes an upstream supporting member and a downstream supporting member, which are disposed in a line symmetrical manner with regard to the center line of the platform extending along the direction perpendicular to the conveying direction.

The space below the respective vehicle bodies supported by the carrier devices continues below the vehicle bodies to form a carrying passage for carrying tools to be used for mounting underbody components on the respective vehicle bodies, and a space for placing underbody components is formed below the vehicle bodies supported by the carrier devices, separately from the carrying passage.

It is thereby possible to place a carriage for components between the upstream supporting member and the downstream supporting member below the vehicle body.

Further, carrying passages are formed below the front part of the vehicle body and below the rear part of the vehicle body, respectively, and it is possible to use the carrying passages as a space for carrying tools for mounting components.

Thus, it is possible to place a wagon having tools thereon and a carriage having components thereon below the vehicle body.

Therefore, it is possible to suppress increase in the walking distance at the time of bringing components and thereby to increase working efficiency.

CITATION LIST

Patent Literature

Patent Document 1: Japanese Patent No. 4752929

SUMMARY

Technical Problem

According to the disclosure of Patent Document 1, the supporting unit for supporting the vehicle body is disposed in a line symmetrical manner with regard to the center line of the platform extending along the direction perpendicular to the conveying direction.

Accordingly, the width between the support columns fixed to the platform, of the supporting unit which supports the vehicle body is narrower than the width of the vehicle.

On the other hand, many of the components mounted in the lower part of the vehicle body, such as front and rear suspensions, engine and transmission, exhaust pipes, and fuel tanks, are relatively large in size.

The space between the upstream supporting member and the downstream supporting member is narrow for carrying such components through the space, which may reduce efficiency of the mounting work.

In view of the above technical problem, an object of at least one embodiment of the present invention is to provide a vehicle assembly line which can improve working efficiency of mounting components in the lower part of the vehicle body.

Solution to Problem

In order to solve such a problem, a vehicle assembly line according to at least one embodiment of the present invention comprises a plurality of carrier devices each for carrying a vehicle body along the line by moving on a floor surface while supporting the vehicle body, the vehicle assembly line being for mounting a component in a lower part of the vehicle body supported by the carrier device. Each of the plurality of carrier devices includes: a supporting unit configured to be in contact with the lower part of the vehicle body to support the vehicle body in a position such that a front-back direction of the vehicle body is perpendicular to a conveying direction; and a platform for fixing the supporting unit thereon. The supporting unit includes an upstream supporting member and a downstream supporting member provided upstream and downstream of the platform along the conveying direction, respectively. Each of the upstream supporting member and the downstream supporting member has a support column fixed on the platform, a center of the support column of the upstream supporting member and a center of the support column of the downstream supporting member being located upstream and downstream, respectively, with respect to a center line of the platform extending in a direction perpendicular to the conveying direction of the platform, and located apart from and opposite to each other across a center line of the platform extending in the conveying direction.

With the above configuration, since the positions of the centers of the support columns supporting member are located upstream and downstream, respectively, with respect to a center line of the platform extending in a direction perpendicular to the conveying direction of the platform, and located apart from and opposite to each other across a center line of the platform extending in the conveying direction, entrance to the working space below the vehicle body is relatively large. Accordingly, it is possible to make it easy to carry relatively large components into the working space, thereby to improve the efficiency of the mounting work, and it is possible to avoid contact between components, thereby to prevent reduction in the quality due to e.g. deformation of the components.

In some embodiments, the length of the platform in the conveying direction is such that a space for receiving a component carriage for carrying a component to be mounted in the lower part of the vehicle body is ensured between vehicles supported by adjacent supporting units.

With the above configuration, since the platform has a length in the conveying direction such that a space for receiving a component carriage can enter between vehicle bodies, it is possible to reduce number of walk steps of assembly workers for the assembly. Further, considering in combination the relatively large entrance into the working space below the vehicle body, it is possible to improve the working efficiency.

In some embodiments, among the plurality of carrier devices, the downstream supporting member of a carrier device on the upstream side of the vehicle assembly line and the upstream supporting member of a carrier device on the downstream side of the vehicle assembly line are located apart from and opposite to each other across the center line of the platforms extending in the conveying direction.

With the above configuration, since the supporting members are located with a distance (offset), between the vehicle bodies, in the direction perpendicular to the center line extending in the conveying direction, it becomes easy to bring a component into the working space.

In some embodiments, the supporting member includes: the support column; a supporting arm disposed at an upper end part of the support column and extending along the direction perpendicular to the conveying direction; and a plurality of receiving seats for receiving the vehicle body, provided on the upper surface of the supporting arm. Each of the support column of the upstream supporting member and the support column of the downstream supporting member of the supporting unit has a stay portion extending toward the center line extending in the direction perpendicular to the conveying direction of the platform, and on an upper surface of the stay portion, the supporting arm and the plurality of receiving seats are arranged in this order.

With the above configuration, the stay portions extend from the supporting columns of the upstream supporting member and the downstream supporting member in the vehicle width direction, and on an upper surface of each of the stay portions, the supporting arm for lifting the vehicle and the plurality of receiving seats are arranged in this order, the working space below the vehicle body is relatively large (in the vehicle direction), and the mounting work can be improved.

In some embodiments, at least one of the plurality of receiving seats is located on an extended line of an axis line of the support column.

With the above configuration, since one of the plurality of receiving seats is placed on the axis line of the support column, it is possible to suppress the bending moment for the support column generated by the load of the vehicle body to reduce the amount of the reinforcing material for preventing deformation of the support column, thereby to reduce the cost.

In some embodiments, the platform includes: a platform base configured to be guided by a rail provided along the conveying direction on the floor surface to move in the conveying direction; a base isolation table which is movable along the direction perpendicular to the conveying direction of the platform base and to which the supporting unit is fixed; and a base isolation device for absorbing vibrations of the base isolation table.

With the above configuration, by disposing, between the platform and the base isolation table, base isolation members for horizontal and vertical vibrations, it is possible to prevent fall of the vehicle from the supporting unit in the event of an earthquake.

In some embodiments, the vehicle assembly line further comprises a lock mechanism for locking a relative displacement between the base isolation table and the platform base. The lock mechanism is configured to release the lock mechanism to permit the base isolation device to operate when at least a predetermined displacement force is applied between the base isolation table and the platform base.

With the above configuration, it is possible to prevent a foothold for workers from becoming unstable and to keep the mounting work from becoming difficult when the base isolation table is shaken at the time of assembly work, and when at least a predetermined displacement force is applied between the base isolation table and the platform base, the lock mechanism is released to provide a base isolation effect, whereby it is possible to prevent fall of the vehicle from the supporting unit.

In some embodiments, the base isolation table includes: a horizontal isolation member for absorbing vibrations along the horizontal direction, the horizontal isolation member being disposed between a lateral side of the platform base and a lateral side of the base isolation table, the lateral side being disposed in the direction along which the base isolation table is movable, and a vertical isolation member for absorbing vibrations along the vertical direction, the vertical isolation member being disposed between an upper surface of the platform and a lower surface of the base isolation table.

With the above configuration, by disposing a spring member on the support column side, it is possible to absorb input from the support column effectively, and by disposing a spring member and a damper member to form an X shape with respect to the center of the base isolation table, it is possible to prevent the base isolation table from rotating in the horizontal plane.

Advantageous Effects

According to at least one embodiment of the present invention, a vehicle assembly line by which working efficiency of mounting components in the lower part of the vehicle body can be improved, is provided.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

First Embodiment

Figure 1:
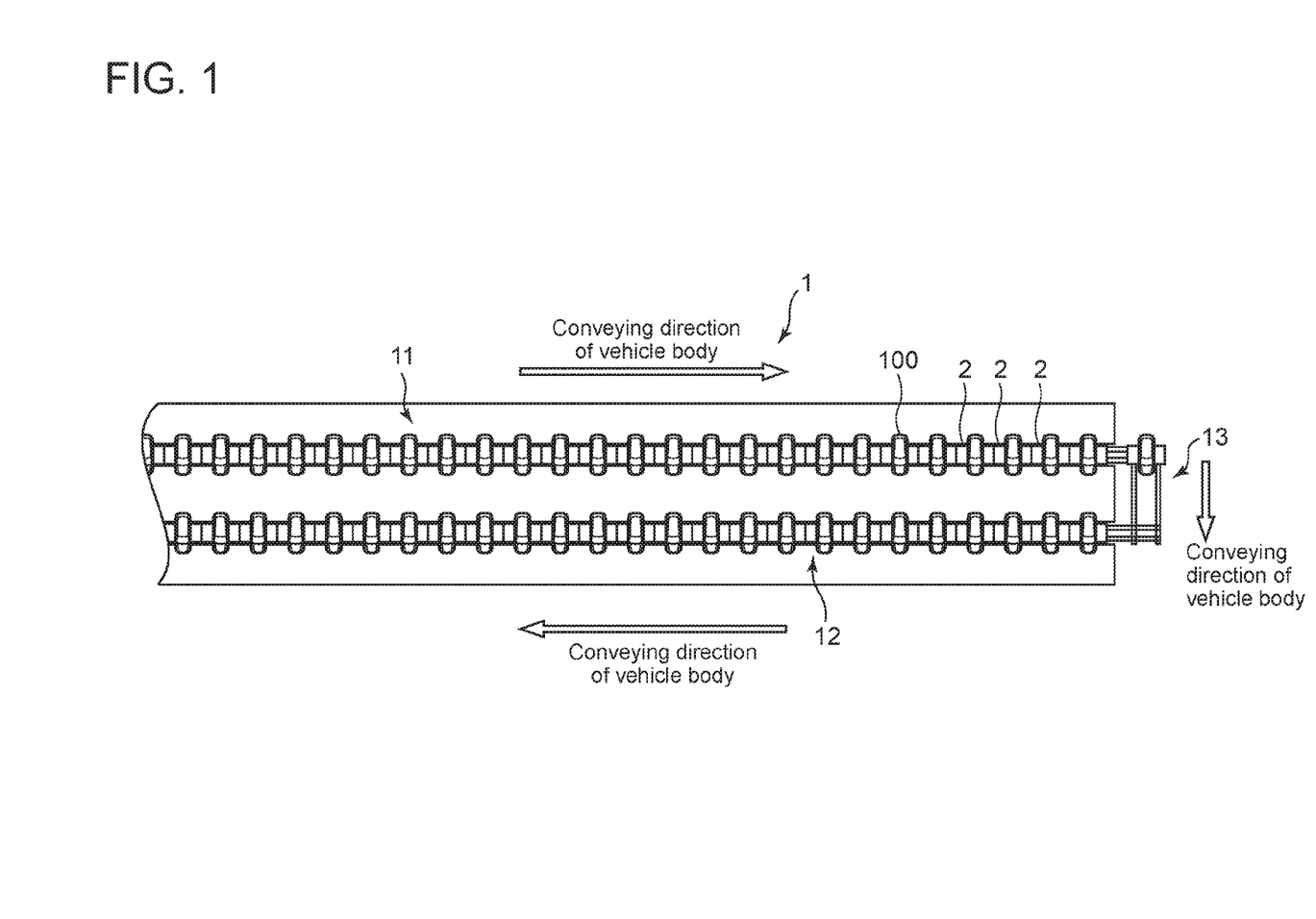
FIG. 1 is a schematic diagram illustrating a vehicle assembly line according to an embodiment of the present invention.

FIG. 1 is a schematic diagram illustrating a vehicle assembly line according to an embodiment of the present invention. Particularly, the vehicle assembly line is an assembly line for mounting components in the lower part of vehicles.

As shown in FIG. 1, the vehicle assembly line 1 for mounting components in the lower part of vehicle bodies 100 in the embodiment includes a plurality of carrier devices 2, a first assembly line 11 provided on the upstream side of the assembly line 1 along which the plurality of carrier devices 2 are carried, a second assembly line 12 provided on the downstream side of the assembly line 1 and arranged parallel to the first assembly line 11, and a line connecting portion 13 for connecting a downstream end of the first assembly line 11 and an upstream end of the second assembly line 12.

The first assembly line 11, the line connecting portion 13 and the second assembly line 12 are arranged to form substantially a U shape in a plan view.

The vehicle assembly line 1 includes a first carrier rail 110 for carrying the carrier device 2 on the first assembly line 11 and a second carrier rail 120 for carrying the carrier device 2 on the second assembly line 12 (see FIG. 5B), which are built on a floor F. The vehicle bodies 100 are placed on the plurality of carrier devices (2, . . . , 2), respectively and are carried along the first carrier rail 110 and the second carrier rail 120, following the conveying direction, continuously and without space.

In such a condition, a worker performs mounting work in a standing position below the vehicle bodies 100 (see FIG. 7) to assemble the vehicle bodies 100 one by one, in order.

The first carrier rail 110 and the second carrier rail 120 have number of carrier follower rollers 122 provided for transferring the carrier devices 2, which do not drive by themselves.

Further, the first carrier rail 110 and the second carrier rail 120 have a plurality of carrier driving parts 121 provided on their lateral side and configured to contact with a lateral side of the carrier devices 2, for transferring the carrier devices 2 toward the conveying direction.

Each of the carrier driving parts 121 includes a carrier driving roller 121b configured to contact with the lateral side of the carrier devices 2, and a carrier motor 121a for rotating the carrier driving roller 121b in the conveying direction of the carrier devices 2.

The carrier follower roller 122 is a supporting member configured to rotate in synchronization with the transferring of the carrier devices 2 so as to facilitate stable transferring of the carrier devices 2.

Now the line connecting portion 13 will be described with reference to FIG. 2 and FIG. 3.

Figure 2:
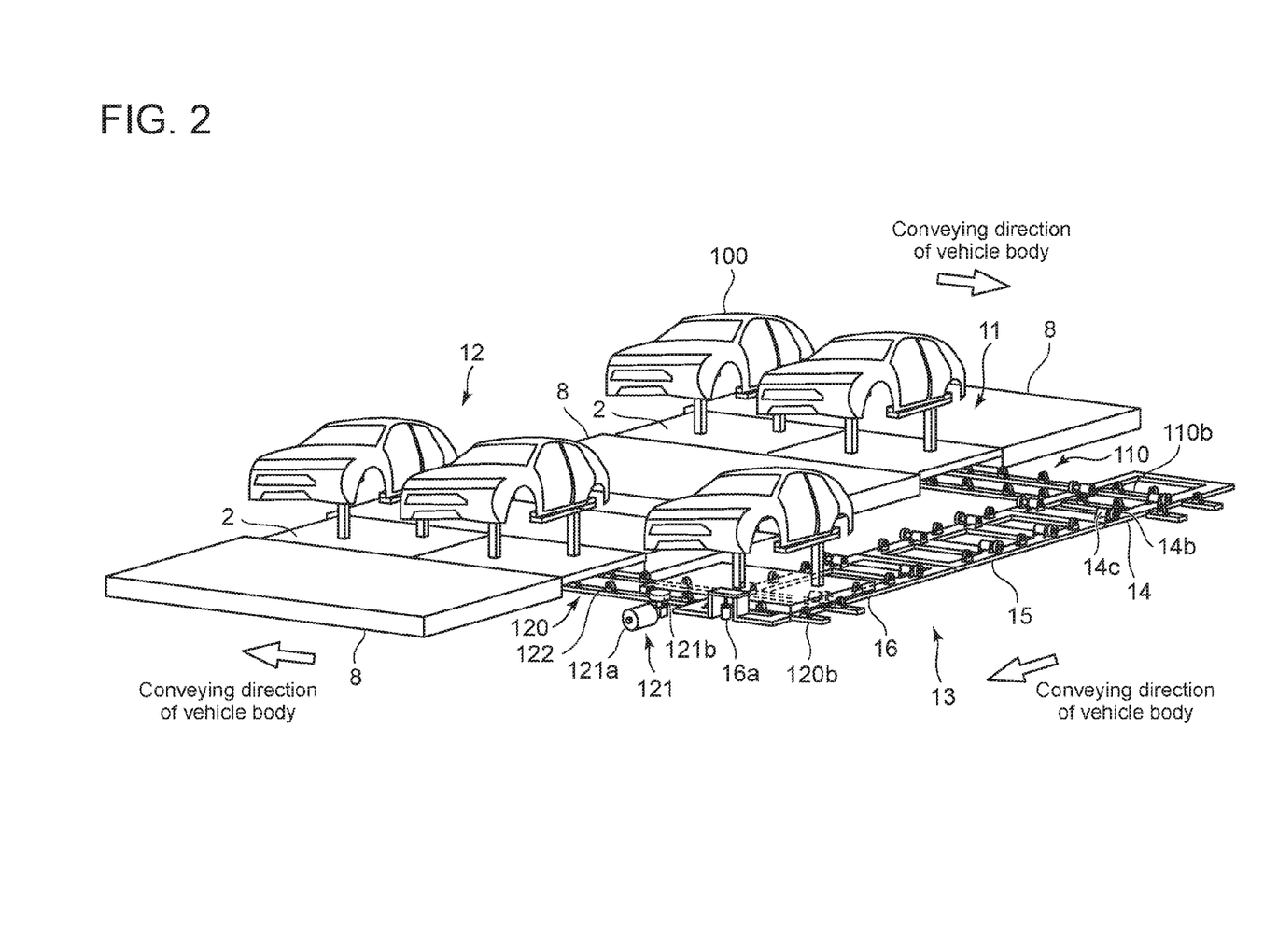
FIG. 2 is a perspective view of a line connecting portion.
Figure 3:
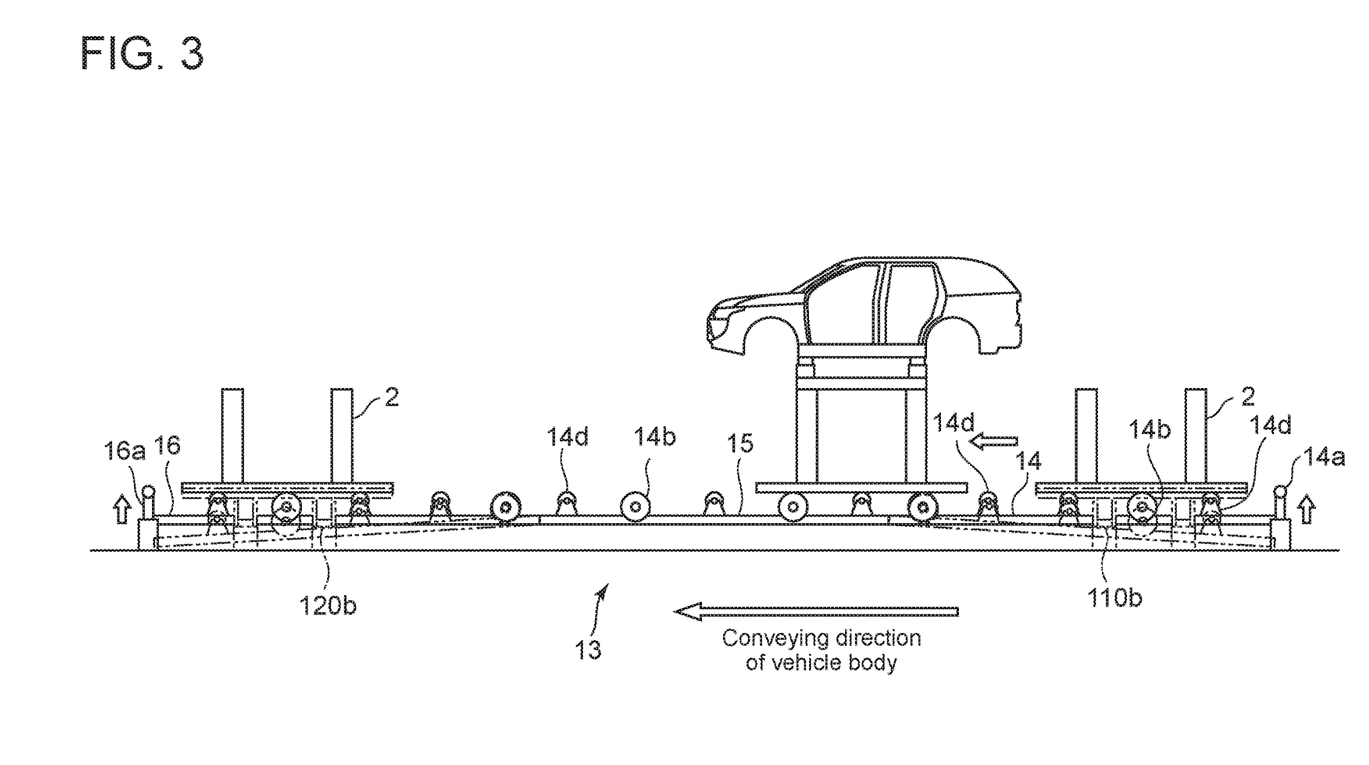
FIG. 3 is a schematic side view of a line connecting portion.

FIG. 2 is a perspective view of the line connecting portion, and FIG. 3 is a schematic side view of the line connecting portion.

The line connecting portion 13 includes a receiving portion 14 disposed below a first extending portion 110b, of the first assembly line 11, extending on the connecting portion 13 side of a downstream end portion of the first assembly line 11, for receiving the carrier device 2 from the first assembly line 11; a transferring portion 15 for transferring the carrier device 2 from the first assembly line 11 side to the second assembly line 12 side; and a passing portion 16 configured to pass the carrier device 2 to the second assembly line 12 side via a second extending portion 120b when the carrier device 2 arrives at the second extending portion 120b provided further upstream of the upstream end portion of the second assembly line 12.

The receiving portion 14 is disposed, in the vertical direction, below the first extending portion 110b of the first assembly line 11, which extends on the line connecting portion 13 side across the downstream end portion of the first assembly line 11. When the carrier device 2 arrives at the extending portion 110b, the receiving portion 14 is moved upward by a cylinder 14a to lift up the carrier device 2 above the first extending portion 110b, and receives the carrier device 2 from the first assembly line 11.

The receiving portion 14 has provided a driving roller 14b configured to be rotated by a motor 14c, for transferring the carrier device 2.

Reference character 14d in the figures indicates a follower roller, which does not drive by itself and which is rotated, supporting the carrier device 2, to transfer the carrier device 2 stably.

When the receiving portion 14 lifts up the carrier device 2 above the first extending portion 110b, the driving roller 14b is rotated to transfer the carrier device 2 to the transferring portion 15 side.

The transferring portion 15 has provided a number of driving rollers 14b and follower rollers 14d, as is the case with the receiving portion 14, for transferring the carrier device 2 to the passing portion 16 side.

The passing portion 16 is disposed above the second extending portion 120b provided further upstream of the upstream end portion of the second assembly line 12.

When the carrier device 2 arrives at the passing portion 16, the passing portion 16 is moved, by a cylinder 16a, to have a shallow downward incline with the downstream end portion of the transferring portion 15 fixed as the pivot point, as illustrated in FIG. 3, and the carrier device 2 is placed on the second extending portion 120b.

It is thereby possible to allow the vehicle body 100 to be moved from the first assembly line 11 to the second assembly line 12 in a parallel manner while the orientation of the vehicle body 100 (the front-back direction of the vehicle body) is maintained.

Further, the first carrier rail 110 and the second carrier rail 120 have number of carrier follower rollers 122 provided for transferring the carrier devices 2.

Further, the first carrier rail 110 and the second carrier rail 120 have a plurality of carrier driving parts 121 provided on their lateral side and configured to contact with a lateral side of the carrier devices 2, for transferring the carrier devices 2 toward the conveying direction.

Each of the carrier driving parts 121 includes a carrier driving roller 121b configured to contact with the lateral side of the carrier devices 2, and a carrier motor 121a for rotating the carrier driving roller 121b in the conveying direction of the carrier devices 2.

The carrier follower roller 122 is a supporting member configured to rotate in synchronization with the transferring of the carrier devices 2 so as to facilitate stable transferring of the carrier devices 2.

As described above, the line connecting portion 13 is configured to allow the vehicle body 100 carried along the first assembly line 11 to move in a parallel manner and to be placed on the upstream end portion of the second assembly line 12.

That is, the vehicle body 100 carried along the first assembly line 11 is transferred in a position such that the front-back direction is maintained perpendicular to the conveying direction and that the front side of the vehicle body 100 is maintained facing the second assembly line 12 side.

Further, the line connecting portion 13 is configured to allow the vehicle body 100 to move along the line connecting portion 13 in a parallel manner (in a state where the orientation of the vehicle body 100 is not changed) and to be placed on the second assembly line.

Accordingly, while the vehicle body 100 is conveyed along the first assembly line 11, the rear side of the vehicle body 100 is positioned on the outer side of the first assembly line 11, and while the vehicle body 100 is conveyed along the second assembly line 12, the front side of the vehicle body 100 is positioned on the outer side of the second assembly line 12.

In many cases, among the components to be mounted to the vehicle body, an engine, a transmission, a front suspension and the like are mainly mounted on the front side of the vehicle body, and a fuel tank, a rear suspension and the like are mounted on the rear side of the vehicle body.

In this embodiment, when the vehicle body 100 is conveyed along the first assembly line, the fuel tank, the rear suspension and the like are mounted first, and then, when the vehicle body 100 is conveyed along the second assembly line, the engine, the transmission, the front suspension, and the like are mounted, whereby it is possible to reduce difference in the weight between the front side and the rear side of the vehicle body on the supporting unit, thereby to improve stability of the vehicle body at the time of mounting work.

Further, by the above configuration, by placing the first assembly line and the second line close to each other, it is possible to reduce the line space and to reduce the carrying distance of the component from the outside, thereby to improve the working efficiency.

The front-back direction of the vehicle body 100 does not need to be specified, and the orientation of the vehicle body 100 to be conveyed along the first assembly line 11 may be defined taking the size, the weight or the like of the component into account.

Figure 4:
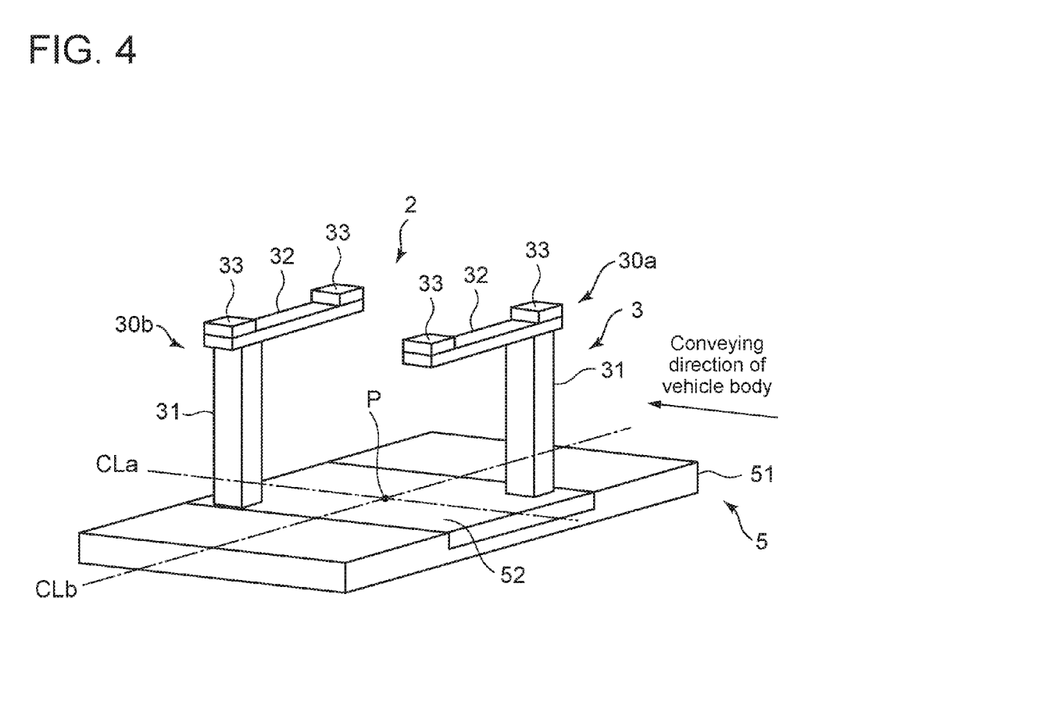
FIG. 4 is a schematic perspective view of a carrier device according to a first embodiment of the present invention.

Now, the structure of the carrier device 2 will be described with reference to FIG. 4, FIG. 5A and FIG. 5B.

The carrier device 2 includes a platform 5 configured to be carried on the first carrier rail 110 (and the second carrier rail 120), and a supporting unit 3 on which the vehicle body 100 is placed.

The platform 5 includes a platform base 51 provided on the first carrier rail 110 (or the second carrier rail 120) built on the floor F and configured to be carried on the roller surface of the carrier follower roller 122, a base isolation table 52 having an upper surface on which the supporting unit 3 is fixed, and a base isolation device 6 provided between the platform base 51 and the base isolation table 52.

The structure of the isolation device 6 will be described with reference to FIGS. 5A and 5B.

The base isolation device 6 is provided between the platform base 51 and the base isolation table 52. The base isolation device 6 includes plurality of vertical isolation rubbers 63 as vertical isolation members for absorbing vibrations along the vertical direction, both wall surfaces (52a, 52a) of the base isolation table 52 arranged along the direction perpendicular to the conveying direction, coil springs (61, 61) as spring members constituting horizontal isolation members provided between arranged both walls (52a, 52a) of the platform base 51 arranged along the direction perpendicular to the conveying direction, and dampers (62, 62) for damping vibrations by means of a piston and cylinder of a liquid filled type.

Further, stopper members 56 are provided between the platform base 51 and the base isolation table 52. Each of the stopper members 56 is fixed to the platform base 51 and protrudes toward the base isolation table 52 side.

The stopper members 56 are provided for maintaining the horizontal degree of the base isolation table 52 when a load from the base isolation table 52 is applied to the vertical isolation rubbers 63.

In the embodiment, the vertical isolation members 63 are formed from an isolation rubber.

Alternatively, the vertical isolation members 63 may have a viscous liquid filled damper structure. The viscous liquid filled damper structure may be one for engine mount or may have a common structure provided between a vehicle body 100 and a suspension, and it is not particularly limited.

The coil springs 61 and the dampers 62 are provided along the horizontal direction.

The coil springs (61, 61) are provided on the side where the support column 31 of the supporting unit 3 is fixed on the base isolation table 52.

Figure 5A:
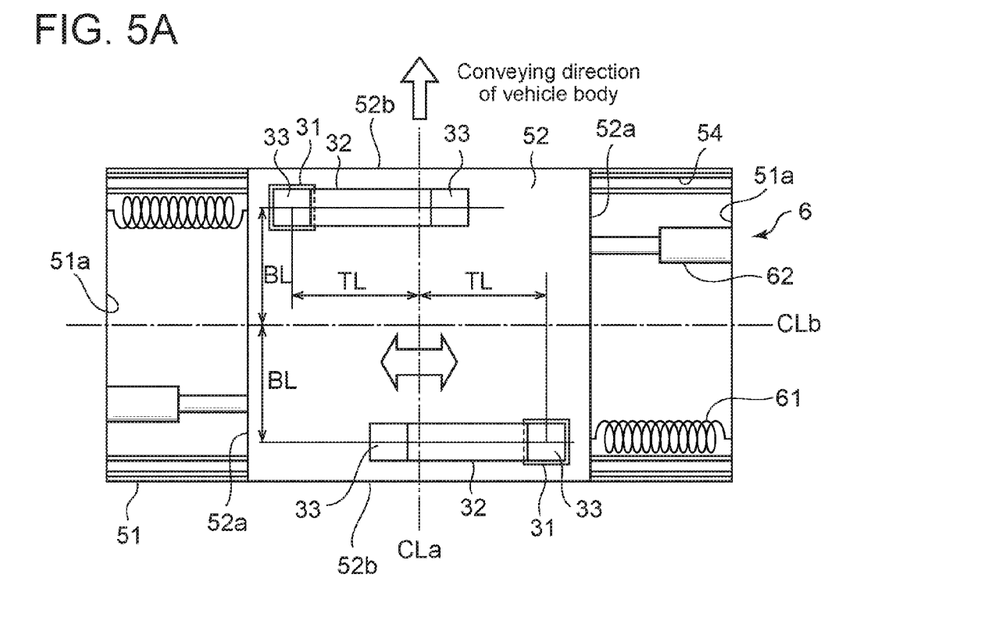
FIG. 5A is a schematic plan view of a base isolation structure of a carrier device according to the present invention.
Figure 5B:
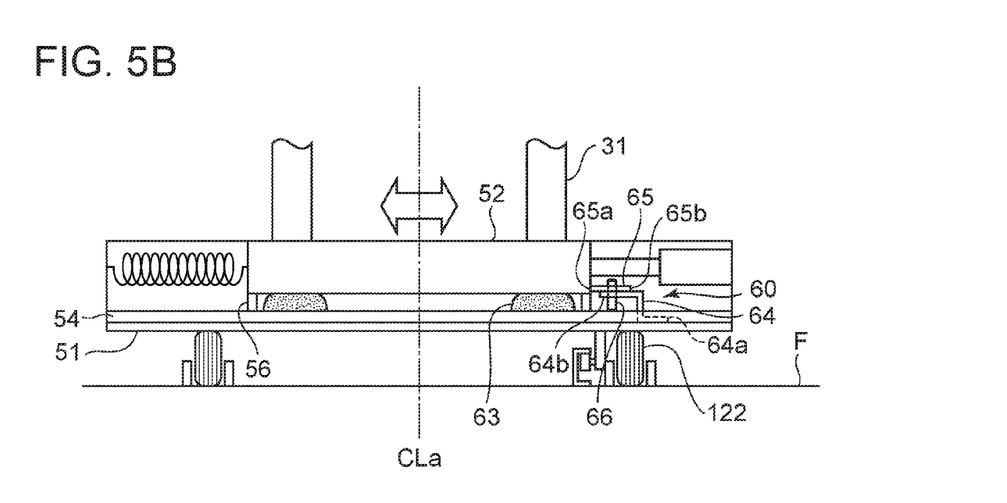
FIG. 5B is a side view of the base isolation structure of FIG. 5A.

Accordingly, as shown in FIG. 5A, the coil springs (61, 61) and the dampers (62, 62) are provided to form an X shape with regard to the center of the base isolation table 52 in the plan view.

Further, on each of the both lateral side of the platform base 51 along the direction perpendicular to the conveying direction, a guide groove 54 to which the lateral side of the base isolation table 52 along the direction perpendicular to the conveying direction is provided for guiding slide along the direction perpendicular to the conveying direction.

Further, the upper surface of the base isolation table 52 and the upper surface of a working platform 8 arranged to surround the first assembly line 11, the second assembly line 12 and the line connecting portion 13 have substantially the same level. A gap to the carrier device 2 is provided so that the assembly line can operate smoothly.

Further, a lock mechanism 60 is provided between the platform base 51 and the base isolation table 52 so that the base isolation table 52 will not move relative to the platform base 51 along the guide groove 54.

The lock mechanism 60 includes: a first stay 64 formed from a plate, having a substantially Z shape in the plan view and having an end 64a fixed on the platform base 51 and the other end 64b extending toward the base isolation table 52, and an insert hole (not shown) to which a shear pin 66 to be described below; a second stay 65 having an end part 65a fixed on the base isolation table 52 and the other end part 65b being in surface contact with the other end 64b, and an insert hole provided at the position facing the insert hole of the first stay 64; and a shear pin 66 inserted into the insert holes.

The lock mechanism 60 is configured such that when at least a predetermined displacement force is applied to the base isolation table 52 along the direction perpendicular to the conveying direction, i.e. along the base isolation direction, the shear pin 66 breaks to allow the base isolation table 52 to move along the direction of the guide groove 54.

The lock mechanism 60 is provided for fixing the base isolation table 52 because it is difficult for a worker to do his/her work on the base isolation table 52 if the footing is not stable.

On the other hand, the lock mechanism is configured such that if at least a predetermined displacement force is applied to the base isolation table 52, the vibration is damped by means of the base isolation device 6 so that the vehicle body 100 placed on the supporting unit 3 will not become unstable to secure the safety.

With the above configuration, vibrations along the direction perpendicular to the conveying direction are likely to be absorbed. Further, input from the support column 31 can be effectively absorbed by disposing the coil spring 61 on the side where the support column 31 of the supporting unit 3 is fixed, and rotation of the base isolation table 52 in the horizontal plane can be prevented by disposing the spring member and the damper to form an X shape with respect to the center of the base isolation table 52, whereby it is possible to prevent unnecessary movement of the vehicle body 100.

The shape of the supporting unit 3 will now be described with reference to FIG. 4 and FIG. 5.

The supporting unit 3 includes a pair of supporting members, that is, an upstream supporting member 30a and a downstream supporting member 30b, provided along the conveying direction on the upper surface of the base isolation table 52.

Each of the upstream supporting member 30a and the downstream supporting member 30b has a support column 31 extending upwardly (i.e. upward along the gravity direction) on the upper surface of the base isolation table 52, a vehicle body lifting member 32 as a supporting arm fixed to the upper end portion of the support column 31 and extending along the direction perpendicular to the conveying direction of the vehicle body 100, and a plurality of receiving seats 33 to be in contact with the vehicle body 100 on the vehicle body lifting member 32.

The support columns 31 have respective centers 31P which are disposed apart from each other with an equal distance BL=BL (for example, a substantially same width 2BL of the side frame of the vehicle body 10) from the center line CLb extending in the direction perpendicular to the conveying direction of the platform 5 (the base isolation table 52), and which are disposed apart from each other with a distance (offset) TL=TL in the direction perpendicular to the center line CLa extending in the conveying direction of the platform 5 (the base isolation table 52) (i.e. the front-back direction of the vehicle body 100). The support columns 31 are disposed so as to be symmetric with respect to the point P of intersection between the center line CLb and the center line CLa. The support columns 31 have a cross-section shape of a substantially regular tetragon, and the cross-section has the center 31P.

In this embodiment, the height of the support column 31 is such that workers can mount components on the lower face of the vehicle body 100 with their arms lifted.

On the upper end portion of the support column 31, the vehicle body lifting member 32 extending along the direction perpendicular to the conveying direction is fixed.

Further, on the upper surface of the vehicle body lifting member 32, a plurality of receiving seats 33 are fixed.

The receiving seats 33 are formed from a resin material, which is a flexible material, in order to be less likely to give damages to the paint of the vehicle body 100.

At least one of the plurality of receiving seats 33 is disposed on an extended lined of the axis line of the support column 31.

Further, the supporting unit 3 is configured to support the side frame part on the both sides in the lower part of the vehicle body 100 between the front tire housing and the rear tire housing, with the upstream supporting member 30a and the downstream supporting member 30b.

With the above configuration, by placing one of the plurality of receiving seats 33 on the axis line of the support column 31, it is possible to suppress the bending moment for the support column 31 generated by the load of the vehicle body 100 to reduce the amount of the reinforcing material for preventing deformation of the support column 31, thereby to reduce the cost.

Further, the length of the platform 5 in the conveying direction is such that a space W1 (see FIG. 6) between the support column 31 of the downstream supporting member 30b of the carrier device 2 on the upstream side of the conveying direction and the support column 31 of the upstream supporting member 30a of the adjacent carrier device 2 on the downstream side.

Figure 6:
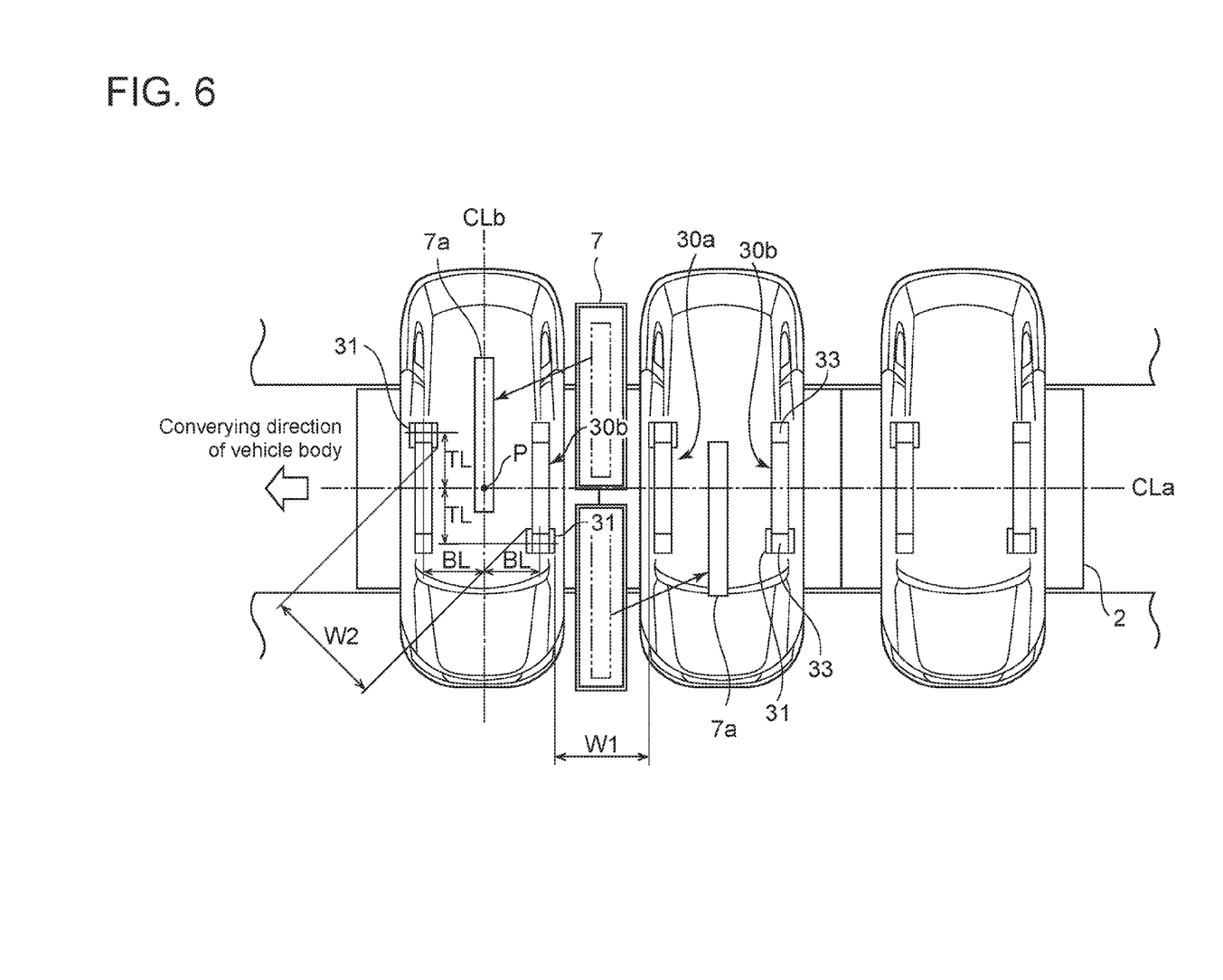
FIG. 6 is a diagram illustrating transferring components to a space below a vehicle body from a component carriage.

The space W1 has a dimension such that a component carriage 7 for carrying a component 7a can go through the space in order to reduce the steps and time for a worker to bring the component 7a at the time of mounting the component on the lower part of the vehicle body 100. Further, since the support column 31 of the downstream supporting member 30b of a carrier device 2 on the upstream side of the conveying direction and the support column 31 of the upstream supporting member 30a of the adjacent carrier device 2 on the downstream side are located with a distance (offset) in the direction perpendicular to the center line CLa extending in the conveying direction of the platform 5 (the base isolation table 52), the worker can easily get the component 7a to be mounted.

Further, as described above, the upper surface of the base isolation table 52 of the platform 5 and the upper surface of the working platform 8 around the assembly line are at substantially same level, whereby the component carriage 7 can easily be carried.

In the above structure of the carrier device for the assembly line, the support column 31 of the upstream supporting member 30a and the support column 31 of the downstream supporting member 30b, which are fixed on the base isolation table 52 of the platform 5, are disposed apart from each other with a distance (offset) TL from the center line CLa of the platform 5 extending in the conveying direction, and disposed with an equal distance BL=BL from the center line CLb extending in the direction perpendicular to the conveying direction. Accordingly, as shown in FIG. 6, the distance W2 between the support columns is large as compared with the case where no offset is provided (i.e. the case where the support columns are disposed symmetrically with respect to the center line CLb of the platform 5 extending in the direction perpendicular to the conveying direction), it becomes easier to carry a component having a larger length or a larger size, and it is possible to prevent collision between a component to be mounted and another component, whereby it becomes easier to ensure quality, when the component to be mounted is carried from the component carriage 7 to the work space below the vehicle body 100.

Further, the height of the support column 31 is such that workers can mount the component on the lower part of the vehicle body 100 with their arms lifted.

Further, the component 7a on the component carriage 7 can be conveyed along with the vehicle body 100 during its assembly on the platform 5, which is carried consecutively one after another in the conveying direction without an interspace. Thus even if there is a lag of the mounting timing for some reasons, the component 7a to be mounted will not get away from the vehicle body 100, whereby it is possible to maintain efficiency of the mounting work.

Figure 7:
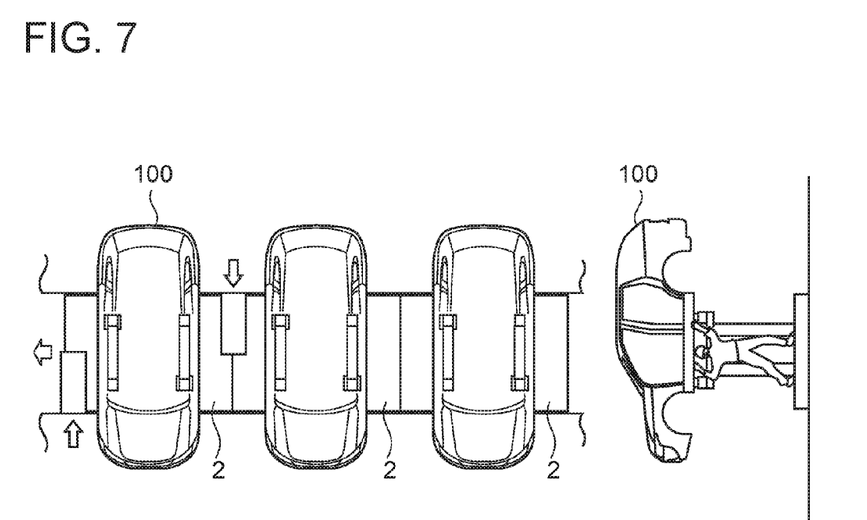
FIG. 7 is a diagram illustrating a work on the vehicle assembly line according to an embodiment of the present invention.

Therefore, as shown in FIG. 7, easiness of going in and out of the working space below the vehicle body 100 and degree of freedom of the work in the working space can be increased, whereby it is possible to increase the efficiency of the mounting work.

Further, the assembly line is provided to form a U shape as a whole, and when the vehicle body 100 is carried on the first assembly line 11, the vehicle body 100 is carried with its front side facing to the inner side of the U shape, and when the vehicle body 100 flows on the second line, the vehicle body 100 is carried with its front side facing to the outer side of the U shape.

Further, the line connecting portion 13 connecting the first assembly line 11 and the second assembly line 12 has a structure such that the vehicle body 100 is transferred to the second assembly line 12 side while maintaining the position of the vehicle body 100 carried on the first assembly line 11.

Accordingly, when mounting the component on the vehicle body 100, it is possible to mount the component on the front side and the rear side of the vehicle body while keeping the component outside the line before the mounting work.

Further, it is possible to reduce the width between the assembly lines, thereby to reduce the space for the whole line.

Further, the component to be mounted can be prepared outside the assembly line 1, whereby it is possible to increase the degree of freedom of the supply pathway for the component to be mounted, thereby to increase the efficiency of the mounting work.

Further, since it becomes unnecessary to work in a space between the assembly lines (i.e. the inner space of the U shape), means (facilities) for accessing to the space becomes unnecessary, whereby it is possible to reduce the facility cost.

Second Embodiment

The second embodiment fundamentally has the same structure as the first embodiment except for the supporting unit.

Accordingly, the same elements as those of the above embodiment are assigned with the same reference numerals as those of the above embodiment, and the same description thereof will be omitted, and the supporting unit according to the second embodiment will be hereinafter described.

Figure 8:
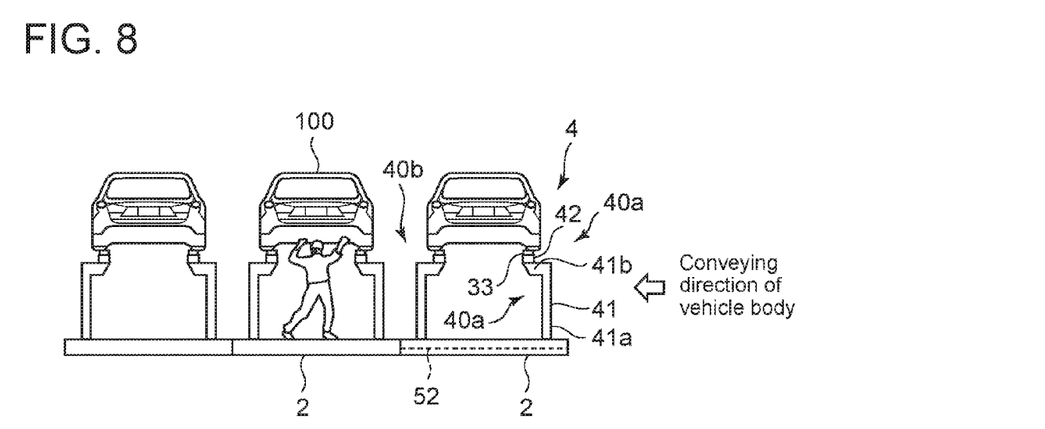
FIG. 8 is a schematic view of a carrier device according to a second embodiment of the present invention.

FIG. 8 is a view in a direction perpendicular to the conveying direction of the assembly line 1.

As shown in FIG. 8, the carrier device 4 includes a platform 5 carried on the carrier follower rollers 122 on the first carrier rail 110 (or the second carrier rail 120), and a supporting unit 40 for placing the vehicle body 100 thereon, having a lower portion fixed on the upper surface of the platform 5.

The platform 5 according to the second embodiment has the same structure as the platform 5 according to the first embodiment, and the description thereof will be omitted.

The supporting unit 40 includes a pair of supporting members, i.e. an upstream supporting member 40a and a downstream supporting member 40b, provided in order along the conveying direction, on the upper surface of the base isolation table 52.

Each of the pair of supporting members, i.e. an upstream supporting member 40a and a downstream supporting member 40b, has a support column 41 extending upwardly (i.e. upward along the gravity direction) on the upper surface of the base isolation table 52, a vehicle body lifting member 42 extending along the direction perpendicular to the conveying direction of the vehicle body 100, and a plurality of receiving seats 33 to be in contact with the vehicle body 100 on the vehicle body lifting member 42.

Further, each of the support column 41 of the upstream supporting member 40a and the support column 41 of the downstream supporting member 40b includes a support column body 41a, and a stay portion 41b extending toward the center line CLb perpendicular to the conveying direction (i.e. extending in the vehicle width direction) at the upper end portion of the support column body 41a.

On the upper surface of the stay portion 41b, a vehicle body lifting member 42 is placed.

The supporting unit 40 is configured to support the side frame part on the both sides in the lower part of the vehicle body 100 between the front tire housing and the rear tire housing, with the upstream supporting member 40a and the downstream supporting member 40b.

With the above configuration, since the stay portion 41b extends in the vehicle width direction from the support column body 41a of each of the upstream supporting member 40a and the downstream supporting member 40b, and the vehicle body lifting member 42 is placed on the upper surface of the stay portion 41b, the working space below the vehicle body, and it is thereby possible to improve easiness of the work in the space.

Further, the assembly line according to this embodiment can be applied to various types of vehicles having different widths, whereby it is possible to reduce the facility cost.

INDUSTRIAL APPLICABILITY

The present invention relates to a vehicle assembly line, which is applicable to an assembly line for a vehicle which is to be mounted with a component on the lower part of the vehicle body.

The invention claimed is:

1. A vehicle assembly line comprising a plurality of carrier devices each for carrying a vehicle body along the line by moving on a floor surface while supporting the vehicle body, the vehicle assembly line being for mounting a component in a lower part of the vehicle body supported by the carrier device,
   wherein each of the plurality of carrier devices includes:
      a supporting unit configured to be in contact with the lower part of the vehicle body to support the vehicle body in a position such that a front-back direction of the vehicle body is perpendicular to a conveying direction; and
      a platform for fixing the supporting unit thereon,
   wherein the supporting unit includes an upstream supporting member and a downstream supporting member provided upstream and downstream of the platform along the conveying direction, respectively, and
   wherein each of the upstream supporting member and the downstream supporting member has a support column fixed on the platform, and a supporting arm disposed at an upper end part of the support column and extending horizontally along the direction perpendicular to the conveying direction, the supporting arm being supported only by a single support column, a center of the support column of the upstream supporting member and a center of the support column of the downstream supporting member being located upstream and downstream, respectively, with respect to a center line of the platform extending in a direction perpendicular to the conveying direction of the platform, and located apart from each other with a distance (offset) and opposite to each other across a center line of the platform extending in the conveying direction.

2. The vehicle assembly line according to claim 1, wherein the length of the platform in the conveying direction is such that a space for receiving a component carriage for carrying a component to be mounted in the lower part of the vehicle body is ensured between vehicles supported by adjacent supporting units.

3. The vehicle assembly line according to claim 1, wherein among the plurality of carrier devices, the downstream supporting member of a carrier device on the upstream side of the vehicle assembly line and the upstream supporting member of a carrier device on the downstream side of the vehicle assembly line are located apart from and opposite to each other across the center line of the platforms extending in the conveying direction.

4. The vehicle assembly line according to claim 1,
wherein each of the upstream supporting member and the downstream supporting member further includes: a plurality of receiving seats for receiving the vehicle body, provided on the upper surface of the supporting arm, and
wherein each of the support column of the upstream supporting member and the support column of the downstream supporting member of the supporting unit has a stay portion extending toward the center line extending in the direction perpendicular to the conveying direction of the platform, and on an upper surface of the stay portion, the supporting arm and the plurality of receiving seats are arranged in this order.

5. The vehicle assembly line according to claim 4, wherein at least one of the plurality of receiving seats is located on an extended line of an axis line of the support column.

6. The vehicle assembly line according to claim 1, wherein the platform includes:
a platform base configured to be guided by a rail provided along the conveying direction on the floor surface to move in the conveying direction;
a base isolation table which is movable along the direction perpendicular to the conveying direction of the platform base and to which the supporting unit is fixed; and
a base isolation device for absorbing vibrations of the base isolation table.

7. The vehicle assembly line according to claim 6, further comprising:
a lock mechanism for locking a relative displacement between the base isolation table and the platform base,
wherein the lock mechanism is configured to release the lock mechanism to permit the base isolation device to operate when at least a predetermined displacement force is applied between the base isolation table and the platform base.

8. The vehicle assembly line according to claim 7, wherein the base isolation table includes:
a horizontal isolation member for absorbing vibrations along the horizontal direction, the horizontal isolation member being disposed between a lateral side of the platform base and a lateral side of the base isolation table, the lateral side being disposed in the direction along which the base isolation table is movable, and
a vertical isolation member for absorbing vibrations along the vertical direction, the vertical isolation member being disposed between an upper surface of the platform and a lower surface of the base isolation table.

9. The vehicle assembly line according to claim 1, wherein the support column supports the supporting arm at a position offset from a center of the supporting arm with respect to a longitudinal direction of the supporting arm.

* * * * *